United States Patent [19]

Schylander

[11] Patent Number: 4,675,857
[45] Date of Patent: Jun. 23, 1987

[54] SYSTEM FOR REPRODUCING INFORMATION FROM AN OPTICALLY READABLE RECORD CARRIER, APPARATUS FOR USE IN SAID SYSTEM, AND RECORD CARRIER FOR USE IN SAID SYSTEM

[75] Inventor: Eric C. Schylander, Eindhoven, Netherlands

[73] Assignee: U.S. Philips Corporation, New York, N.Y.

[21] Appl. No.: 620,986

[22] Filed: Jun. 15, 1984

[30] Foreign Application Priority Data

Feb. 10, 1984 [NL] Netherlands ......................... 8400439

[51] Int. Cl.⁴ .......................... H04N 5/76; G11B 5/09
[52] U.S. Cl. ....................................... 369/59; 369/48
[58] Field of Search .............................. 369/59, 49, 48

[56] References Cited

U.S. PATENT DOCUMENTS 4,022,986  5/1977  Teer et al. .............................. 369/59

Primary Examiner—Vincent P. Canney
Attorney, Agent, or Firm—Thomas A. Briody; Jack Oisher; William J. Streeter

[57] ABSTRACT

A compact-disc-digital-audio-system has bandwidth reduced in order to extend the playing time, for example for the reproduction of 10 hours of speech. This is achieved without significantly modifying the existing players and without affecting the standard EFM coding, by multiplexing a plurality of information channels in such a way that they can be reproduced consecutively by repeatedly playing the entire CD disc.

10 Claims, 4 Drawing Figures

SYSTEM FOR REPRODUCING INFORMATION FROM AN OPTICALLY READABLE RECORD CARRIER, APPARATUS FOR USE IN SAID SYSTEM, AND RECORD CARRIER FOR USE IN SAID SYSTEM

TECHNICAL FIELD

The invention relates to a system for reproducing information from an optically readable record carrier on which information is recorded in the form of an encoded series of digital samples which are recovered by decoding after read-out.

The invention also relates to an apparatus for use in said system and a record carrier for use in said system.

Such a system, apparatus and record carrier is described in Phillips Technical review, Vol. 40, 1982 No. 6. The entire issue, is incorporated herewith by reference. Such apparatuses and record carriers are commercially available under the name of Compact Disc Digital Audio System and are used inter alia for reproducing audio information which is recorded on the optically readable record carrier in digital form by means of an EFM code. By means of these known players record carriers containing one hour of music can be played. The reproduction quality is excellent with respect to the linearity, bandwidth, dynamic range, and signal-to-noise ratio. However, for other purposes these properties may be of subordinate importance. An example of this is the reproduction of talking books for the blind. This requires a substantially smaller bandwidth and stereo reproduction is not necessary. Another example is functional music (background music) where the requirements imposed on the bandwidth and signal-to-noise ratio are less stringent than in the case of hi-fi reproduction. However, for these latter uses long playing time is very desirable. For reasons of economy and compatibility it is also desirable to obtain such a long playing time without significantly modifying the existing Compact Disc Digital Audio player and without modifying the standard EFM code. Solutions such as compression-expansion techniques and time-multiplexing techniques with repeated scanning of the same track turn demand significant modification of the player and it is often impossible to accommodate the synchronizing signals required for such uses within the optimized and standardized EFM code.

SUMMARY OF THE INVENTION

It is the object of the invention to provide a system of the type specified in the opening paragraph as well as an apparatus and a record carrier for use in this system, which yield a longer playing time by limiting the bandwidth without departing from the standard EFM coding used in the Compact Disc Digital Audio System and requiring only a slight modification of the known Compact Disc Digital Audio players.

According to the invention the system is characterized in that N information channels are multiplexed on the record carrier so that each time N consecutive samples are associated with N different information channels and the N information channels can be reproduced one by one by playing the entire record carrier N times, each time under selection of the samples associated with the channel.

In the system according to the present invention the record carrier is played in the same way as in the known players. Modification of the known player comprises a demultiplexer on the digital output and a digital-to-analog converter operated at a lower sampling frequency. The decoding and driving control means need not be modified.

With respect to synchronization of the sample selection, the system according to the present invention may be characterized in that each time at least one bit of the digital samples is used as a synchronizing bit so that during consecutive read-out of the samples the sequence of the bits results in a synchronizing signal which is used for synchronizing the selection of the samples associated with the channel to be reproduced instantaneously.

Thus, by use of one or a few bits of the standard sample (16 bits) for synchronization purposes a synchronizing signal is obtained without modifications to the EFM coding. The fact that this reduces the number of bits available for the audio signal merely leads to a reduction in signal-to-noise ratio which is permissible for the present purpose. Indeed, 14 to 15 bits are sufficient for satisfactory reproduction of speech or functional music.

The preferred embodiment may be characterized further in that the least significant bit of the samples is selected as a synchronizing bit.

The advantage of this embodiment is that a 16-bit analog-to-digital converter may be used without extraction of the synchronizing bit. The digital-to-analog converter supplies this synchronizing bit as a d.c. signal because this bit does not vary within the series of selected samples (but it does vary within the sequence of samples read!).

The apparatus for use in the system in accordance with the invention, comprises a read device, a decoding circuit, and a read-control circuit. The apparatus further comprises selection means for selecting a specific sample from every N samples being reproduced and control means which are constructed to repeatedly play the record carrier and, after every scan, to advance a channel counter which controls the selection means so that the samples associated with the relevant channel are selected.

In another embodiment this apparatus comprises means for extracting synchronizing bits from the decoded signal samples for synchronizing the selection means.

Alternatively, in this preferred embodiment of the invention, in which the decoding circuit is constructed to supply two digital signal samples at the same time, the selection means comprise first switching means for selecting one of the two simultaneously supplied signal samples as a function of the count of the channel counter, and second switching means for selecting a specific sample from every $\frac{1}{2}$ N samples reproduced via the first switching means as a function of the count of the channel counter, N being an even integer.

In the known apparatus the two simultaneously supplied samples are two stereo signal samples. By dispensing with stereo reproduction, in accordance with the present invention, the playing time can be extended additionally by a factor of two.

The preferred embodiment provides a control for presetting the channel counter. This enables the user to start reproduction at any desired point, the starting point within the playing operation is set by the controls which are selectable by controls already present in the known players.

The record carrier for use in the system in accordance with the invention comprises N information channels which are multiplexed on the record carrier so that they can be reproduced consecutively by repeatedly playing the record carrier under selection of the signal samples associated with the channel to be reproduced.

The invention will now be described in more detail by way of example, with reference to the drawings, in which

DESCRIPTION OF THE PREFERRED EMBODIMENTS

Figures 1, 2:
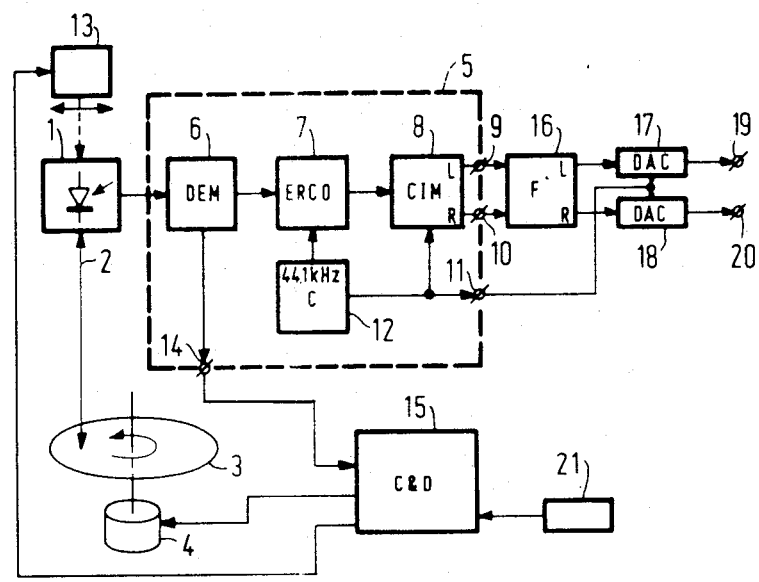
FIG. 1 is a block diagram illustrating the principle of the known Compact-Disc-Digital-Audio system.
FIG. 2 is a table to explain the principle underlying the invention.

FIG. 1 shows schematically the construction of a "Compact Disc Digital Audio" player in so far as it is relevant to the present invention. The player comprises a drive motor 4 for rotating an optical record carrier 3. This record carrier 3 is read by means of a laser beam 2. The reflected laser beam is detected by a detector 1 which converts the amount of light received into an electric signal which is applied to a decoding circuit 5. The radial scanning position can be controlled by a radial drive motor 13, shown schematically. The decoding circuit comprises a demodulator 6 for demodulating the EFM-coded signal supplied by the detector 1. This demodulator 6 extracts inter alia a subcode from the signal, which subcode may contain information about the nature of the recorded signal, for example the title of the piece of music, address information such as the sequence number of the piece of music, and time information such as the elapsed playing time, the total playing time and the playing time per number. This information appears on an output 14 of the decoder circuit 5. The signal, which has been demodulated by the demodulator 6, is applied to an error-correction circuit 7 and subsequently, to a circuit 8 which re-arranges the signals and rejects incorrect audio samples or replaces them by samples obtained by interpolation. This circuit 8 supplies the audio samples as 16-bit parallel digital words to the outputs 9 and 10, each corresponding to one of the two stereo channels L and R. These stereo samples appear with a frequency of 44.1 kHz. Further, the circuit 5 comprises a clock generator 12 which supplies a clock signal with a sampling frequency of 44.1 kHz to the circuits 7 and 8 and to an output 11. The two stereo samples on the outputs 9 and 10 are applied to analog audio outputs 19 and 20 via a digital filter 16 and digital-to-analog converters 17 and 18 which are clocked by said 44.1 KHz clock signal.

The player further comprises a control and display device 15 which controls inter alia the drive motors 4 and 13, which may be effected depending on the user's wishes and set by means of a control 21, such as the address of the passage to be reproduced.

By means of this known apparatus it is possible to play record carriers on which one hour of music is recorded. The reproduction quality as regards linearity, bandwidth, dynamic range, and signal-to-noise ratio are then excellent. However, for some purposes these properties are less important. An example of this is the reproduction of talking books for the blind. For this purpose a substantially smaller bandwidth is required and stereo reproduction is not necessary. Moreover, less stringent requirements are imposed on the signal-to-noise ratio. Another example is functional music (background music) where the bandwidth may be substantially smaller. However, for both uses a long playing time is required. It is also desirable that this be achieved without significantly modifying the existing Compact Disc Digital Audio Player and the standard EFM coding. Solutions such as compression-expansion techniques and time-multiplexing techniques with repeated scanning of the same track turn will lead to considerable modifications to the player and it is impossible to accommodate the synchronizing signals required for this purpose within the optimized and standardized EFM coding. A solution resides in the use of time-multiplexing, not with repeated playing of each track turn but with repeated playing of the entire disc. The audio samples (with a repetition frequency of 44.1 kHz) are divided into groups of N (for Example 5) samples. During the first scan of the disc, all the first samples of these groups are reproduced. During a second scan of the entire disc all the second samples are reproduced and so forth. This results in an increase in playing time by a factor of N and a bandwidth limitation by the same factor N. If stereo reproduction is not required, an additional extension of the playing time by a factor of two can be obtained by providing the two stereo channels with separate information and using them as mono channels. a playing time of ten hours with a bandwidth of 4 kHz is obtained for $N=5$. For the synchronization one (or even more) of the 16 bits may be sacrificed. Suitably, the least significant bit is chosen for this. By choosing this bit as a function of the sequence number of the revelant sample within the group of N samples, a synchronizing pattern is obtained. For example, the bit may be a logic one for the first sample of the group and zero for all the other samples. If the least significant bit is selected for this purpose this bit need not be extracted. The sample may yet be converted as a 16-bit word, the fact that the least significant bit does not contain audio information but clock information has no influence because this does change when each time the same sample within the group of N samples is selected but remains the same, at least for one hour, so that it is present in the analog signal in the form of a d.c. component. For the present purpose the fact that the audio-information 15 bits instead of 16 bits are available, is not objectionable.

By way of illustration, FIG. 2 shows schematically a series of stereo samples $S_1$ to $S_{16}$. These stereo samples each comprise a 16-bit sample L for the left-hand stereo channel and a 16-bit sample R for the right-hand stereo channel. The bits $b_1$ to $b_{15}$ of each sample are available as information bits while bit 16 is the synchronizing bit and is a logic one for every first one of five samples.

If the stereo samples are not separated into two independent mono samples belonging to different channels, it is in principle adequate to select one synchronizing bit in only one of the two stereo channels.

This will be explained with reference to FIG. 3 which shows a Compact Disc Digital Audio player modified in conformity with the foregoing. In comparison with the player shown in FIG. 1, the digital filter 16 and the digital-to-analog converters 17 and 18 have been dispensed with. The digital audio outputs 9 and 10 are connected to a switch 24 by means of which one of the two stereo channels is selected and applied to a hold circuit 25 by means of which a specific sample out of each time one group of N is selected and transferred to a digital-to-analog converter 26, which then operates with a frequency of 44.1/N kHz. The resulting analog output signal is supplied to an output 28 via a low-pass filter 27 which has a cut-off frequency of 20/n kHz.

The hold circuit 25 comprises an input 45 to which a signal may be applied under command of which the hold circuit receives and holds the instantaneously appearing sample until the next command, and an output 29 on which the least-significant bit of all the words appears, i.e. the synchronizing signal. This hold signal is supplied by a counter 23, which counts the clock signal (44.1 kHz) appearing on output 11 and which is reset by the synchronizing signal, i.e. the least-significant bit of every first sample of every group of N bits. The count of the counter 23 then corresponds to the sequence number of the instantaneously appearing sample within the group of N samples. Via a set input 35 the counter 23 can be set so that the count defined by the signal on input 35 generates a hold signal for the hold circuit 25, so that always that sample of the group of N samples which within the group has a sequence number corresponding to the signal on input 35 is reproduced on output 28.

The signal on input 35 is supplied by a counter 32 which receives a count signal from the control and reproducing device 15 on its input 33 after completion of every scan of the disc, device 15 being constructed so that after this, the disc is scanned again from the beginning. Via the counter 23 the next sample is selected from the group of N samples. After N steps of the counter 32 the switch 24 is changed over. In the present example where N=5, this is effected in that by means of the AND-gate 30 the count 4 (=100), i.e. the fifth count, is decoded. After being suitably delayed by the gate 30 this decoded count is combined with the next counting pulse on input 33 in AND-gate 31, so that this AND-gate 31 produces a signal at the end of the fifth scan of the disc. This signal resets the counter 32 via its reset input R and sets the flip-flop 34, which switches the switch 24 from the left-hand channel to the right-hand channel.

Figure 3:
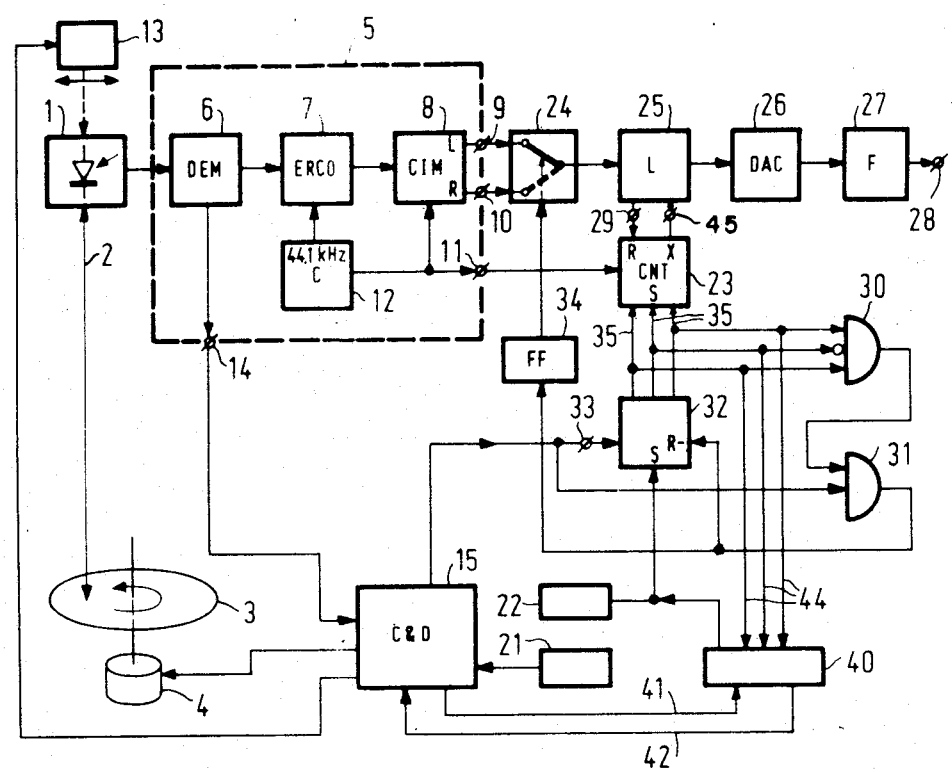
FIG. 3 is a block diagram of a system as shown in FIG. 1 but modified in accordance with the invention.
Figure 4:
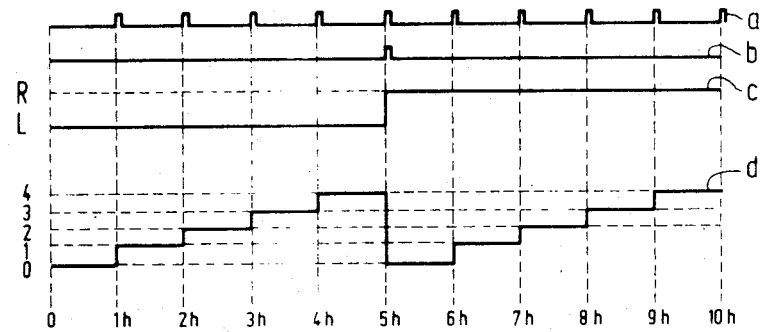
FIG. 4 shows some signal waveforms to illustrate the operation of the system shown in FIG. 2.

FIG. 4 shows some signal waveforms to explain the operation of the apparatus shown in FIG. 3. The signal a is the counting signal on output 33 and comprises a pulse at the end of every scan of the disc, i.e. after every hour. The signal b is the output signal of the AND-gate 31 which resets the counter 32 and which changes-over the flip-flop 34. Signal c is the output signal of the flip-flop 34 which is representative of the state of the switch 24, and curve d represents the count of the counter 32.

By means of a control 22 the user can preset the counter 32 to select a desired scan of the series of 2 N scans and the starting position within the scan can be selected by the addressing means 21 which is also provided with the conventional player shown in FIG. 1.

Instead of manual setting of the control 21, it is alternatively possible to equip the player so that if the scan of the disc is interrupted the position of the channel counter 23 and the position within this scan are stored in a memory to enable starting at this position when the disc is played subsequently. This is possible because in the Compact Disc Digital Audio System the discs are provided with an "index" at the beginning of the disc. By use of this index the relevant disc is inter alia identified and the identification code is read by the control circuit. For this purpose the apparatus comprises a memory 40 which receives and stores a disc-identification code and the instantaneous position on the disc received from the control circuit 15 via a connection 44. Via the connection 44 the memory also receives the position of the channel counter 32. When the disc is to be played again this enables the control circuit 15 to be set via the connection 41 and the channel counter 32 via the connection 43 after read out of the disc-identification code, so that playing is continued at the same position where it was interrupted. Depending on the storage capacity the last playing positions of a plurality of discs may be stored.

What is claimed is:

1. In a system for reproducing information from an optically readable record carrier on which the information is recorded in the form of an encoded series of digital signal samples the improvement comprising a record carrier having a plurality of groups of digital signal samples, each group formed by a predetermined number N of consecutive samples, said N samples within each group being associated with N different information channels multiplexed on said record carrier, each of said N information channels being reproduced one by one by scanning all of said groups of the entire record carrier each time a channel is read, and selecting only samples associated with said channel being read.

2. A record carrier as claimed in claim 1 wherein at least one bit of each digital sample is used as a synchronizing bit during the consecutive read-out of said samples, the sequence of said bits constituting a synchronizing signal for synchronizing selection of said samples associated with said channel to be reproduced instantaneously.

3. A record carrier as claimed in claim 2, wherein a least significant bit of said digital samples is selected as said synchronizing bit.

4. A record carrier for use in a system as claimed in claim 1, comprising N information channels multiplexed on the record carrier for consecutive reproduction from said continuously played record carrier by selecting specific signal samples associated with each channel being reproduced.

5. A system as claimed in claim 1, comprising means for storing a playing position reached on said record carrier when reproduction has been interrupted, whereby said portion may be recalled for automatically restarting reproduction at said position.

6. An apparatus as claimed in claim 5, further comprising means for storing an identification code for the record carrier being played, an identification of a reproducing position on said record carrier reached when reproduction has been interrupted, an identification of a channel being reproduced, and means for presetting said apparatus for restarting playing at the position where interruption occurred.

7. In a system for reproducing information from an optically readable record carrier on which the information is recorded in the form of an encoded series of digital signal samples being decoded after read-out, an apparatus comprising:

a read device for scanning information signals on said record carrier, a decoding circuit for receiving and decoding signals from said read device, a read-control means for controlling said scanning by said read device, selection means for selecting a specific signal sample from a plurality of groups of N consecutive samples which form a single channel;

a channel counter controlling said selection means for selecting only samples associated with a specific channel being read; and control means for advancing said channel counter for selection of a next channel to be read after completion of each scan of the entire record carrier while said record carrier is being continuously played, whereby a different signal sample in each of said groups is read forming said next channel.

8. An apparatus as claimed in claim 7, further comprising means for extracting synchronizing bits from the decoded signal samples for synchronizing said selection means.

9. An apparatus as claimed in claim 7, wherein said decoding circuit simultaneously supplies two digital signal samples and said selection means comprises first switching means for selecting one of said two simultaneously supplied signal samples as a function of the count of said channel counter, and second switching means for selecting a specific sample of every N/2 samples reproduced via said first switching means as a function of the count of the channel counter, N being an even integer.

10. An apparatus as claimed in claim 7, further comprising control means for presetting said channel counter.

* * * * *